May 23, 1961 E. E. SIVACEK 2,985,272
FLUID COUPLING
Filed Nov. 13, 1956
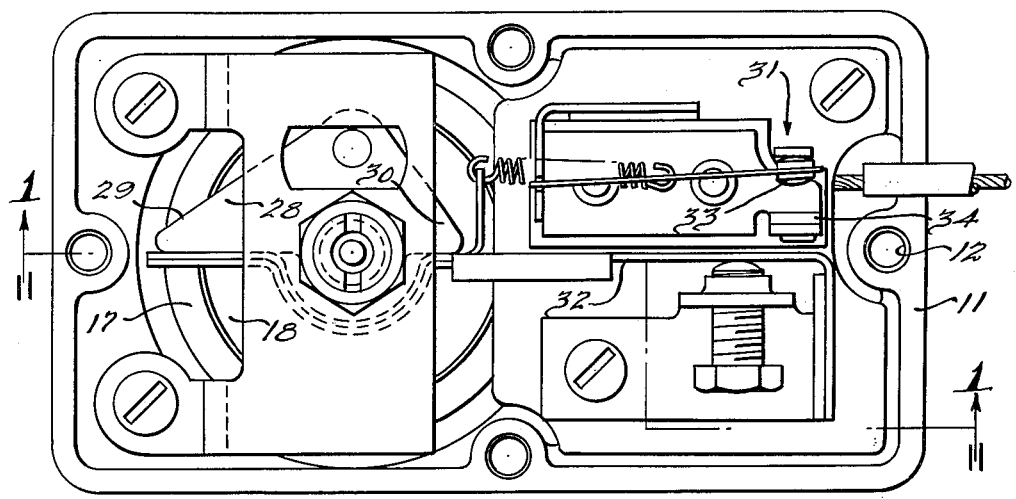
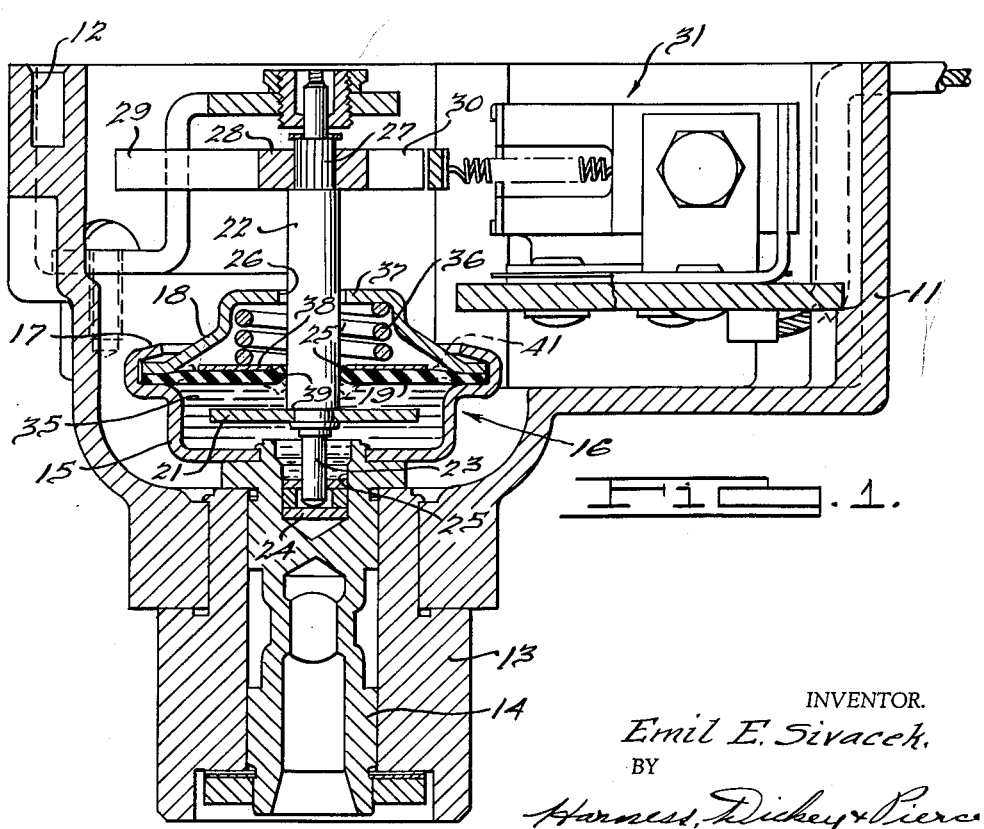
INVENTOR.
Emil E. Sivacek.
BY
Harness, Dickey & Pierce
ATTORNEYS.

United States Patent Office 2,985,272
Patented May 23, 1961

2,985,272

FLUID COUPLING

Emil E. Sivacek, Ann Arbor, Mich., assignor to King-Seeley Corporation, Ann Arbor, Mich., a corporation of Michigan Filed Nov. 13, 1956, Ser. No. 621,680

5 Claims. (Cl. 192—58)

This invention relates to fluid couplings, and more particularly to couplings in which the degree of torque transmission varies in response to the relative speeds of the driving and driven members.

There are many important applications of fluid couplings in which it is desired that the torque transmitted from the driving to the driven member be varied in response to a change of speed of one or both of these members. Examples of such use of fluid couplings are found in the automotive field, where for example it may be necessary to prevent manual operation of a mechanical parking lock when the vehicle is traveling above a predetermined speed in order to avoid equipment damage. In the case of vehicles having automatic transmissions, which may "creep" forward when stopped temporarily unless brake pedal pressure is maintained, a similar type of fluid coupling has been found useful for operating a switch which will cause brake pressure to be maintained once it is applied at a low speed, the switch not being operated at higher speeds.

In the construction of this type of fluid coupling, problems arise with respect to the reliability of performance in view of the relatively severe operating conditions present in automotive installations. In particular, the changes in configuration of the body of fluid in the coupling due to sudden acceleration or deceleration of the vehicle may cause air bubbles to be entrained in the fluid, thus impairing the subsequent operation of the coupling.

It is an object of the present invention to provide a novel and improved fluid coupling in which the torque transmitted from the driving member to the driven member will be relatively low when the driving member rotates below a predetermined speed and relatively high above that speed, and in which the coupling will be highly torque-sensitive, so that operation of a switch or other device may be accomplished at relatively low rotative speeds of the driving member.

It is another object to provide an improved fluid coupling of this nature which is reliable and accurate in performance, is of relatively simple construction, thus being economical to fabricate and easy to maintain.

It is a further object to provide an improved fluid coupling having the above characteristics, which is especially adapted for the rough usage associated with automotive applications, and which includes means for preventing the entrainment of air bubbles in the fluid which might hinder operation of the device.

Other objects, features and advantages of the present invention will become apparent from the subsequent description, taken in conjunction with the accompanying drawings:

In the drawings:

Figure 1 is a cross-sectional view in elevation of the improved fluid coupling with an associated switch mechanism, taken along the line 1—1 of Figure 2; and Figure 2 is a plan view of the fluid coupling and switch showing the relative location of the parts.

The device comprises a casing 11 of generally rectangular shape and having an open top, a flat cover (not shown) being attachable thereto utilizing bolt holes 12. Formed in the bottom portion of casing 11 is a hollow depending boss carrying a bushing 13 within which is rotatably mounted a driving shaft 14. Shaft 14 may be secured, for example, to a cable (not shown) similar to a vehicle speedometer cable which will cause the rotational speed of shaft 14 to be directly proportional to the speed of the vehicle engine or drive shaft. The upper end of shaft 14 has secured thereto the lower portion 15 of a coupling casing or shell generally indicated at 16 in Figure 1. Shell portion 15 is of hollow annular shape, having a bent over upper flange 17 holding the lower edge of upper shell portion 18. A diaphragm 19 has its outer edge secured between portions 15 and 18 of shell 16, the diaphragm being fabricated of rubber or similar material.

Within the chamber formed between diaphragm 19 and the interior of shell portion 15 is disposed a driven disk 21, the diameter of this disk being substantially less than the diameter of the main portion of shell portion 15 which surrounds the disk. Disk 21 is secured to the lower portion of a driven shaft 22 which is rotatably supported at its lower end 23 by a bearing 24 disposed within a central aperture 25 in the upper end of driving shaft 14. Shaft 22 extends through a central aperture 25' in diaphragm 19 and a central aperture 26 in upper shell portion 18, the upper end 27 of shaft 22 having staked thereto a switch operating cam 28.

Since the details of the switch and its associated parts form no part of the present invention, they need not be described in detail. The parts illustrated are similar to those described and claimed in copending application Serial No. 621,614 filed November 13, 1956, now Patent No. 2,844,677, granted July 22, 1958, by Tore Berset Hanssen and assigned to the assignee of the present application. In general, it may be stated that cam 28 has two lobes 29 and 30 respectively which will actuate a switch generally indicated at 31 when cam 28 is rotated in either a clockwise or a counterclockwise direction in Figure 2. More specifically, spring arm 32 of switch 31 will normally engage lobes 29 and 30 of cam 28 with sufficient force to hold the cam, along with driven shaft 22 and disk 21, in a stationary position. This position of spring arm 32, through an overcenter connection, will cause switch 31 to be in its open position as shown in Figure 2. When the torque transmitted from driving shaft 14 to driven shaft 22 exceeds a predetermined amount, spring arm 32 will be deflected and switch 31 will be shifted from its normally open position to its closed position in which contact 33 thereof will engage stationary contact 34.

The chamber formed by diaphragm 19 and lower shell portion 15 is filled with a fluid 35, which preferably comprises any one of the widely known silicone oils or greases now commonly in use. The properties of such liquids are such that they have a relatively high viscosity at normal temperatures which will be reduced when the temperature of the compound is elevated. Moreover, it has been found that such fluids are capable of transmitting sufficient torque at very low speeds of the driving shaft to operate a switch of the character shown in the illustrated embodiment. While the torque transmitted from driving shaft 14 to driven shaft 22 at low and medium speeds will be proportional to the speed of shaft 14, at higher speeds the torque curve will be flattened out due to the fact that the viscosity of fluid 35 will be reduced. Damage to the switch or coupling parts at high vehicle speeds will thus be prevented.

The improved fluid coupling construction of this invention includes means for preventing air entrainment in fluid 35 which might occur upon sudden changes in speed of driving shaft 14. It should be noted that, if we consider shell portion 15 to be the driving member and disk 22 the driven member of the fluid coupling, fluid 35 has what could be termed a "free" upper surface, since the configuration of this surface is controlled mainly by the forces acting on fluid 35. Upon high speeds being attained by the driving shaft, this free surface of fluid 35 would normally tend to draw away from shaft 22 which it surrounds due to centrifugal forces acting on the fluid, leaving a column of air adjacent the shaft. Upon sudden deceleration of driving shaft 14, which might occur in normal automotive operation, the sudden rush of fluid 35 toward shaft 22 might cause air bubbles to be entrapped in the fluid. Subsequently, the frictional drag between fluid 35 and its associated members could be impaired by the presence of these air bubbles, making the device inoperative for its intended purpose.

In the present embodiment, diaphragm 19 is adapted to maintain engagement with the free surface of fluid 35 during changes in its configuration, thus preventing entrapment of air bubbles which might otherwise occur. For this purpose, a helical compression spring 36 is provided between the upper surface 37 of shell portion 18 and a flat annular plate 38 which rests on the upper surface of diaphragm 19. As seen in Figure 1, the dimensions of plate 38 are such as to expose the inner and outer portions of diaphragm 19. Spring 36 imposes a constant downward pressure upon diaphragm 19, thus maintaining engagement between the diaphragm and the upper fluid surface when fluid 35 is withdrawn from the vicinity of shaft 22. Moreover, the inner circular lip 39 of diaphragm 19 is so dimensioned that it has a slight excess area over that which would be required to snugly engage shaft 22. This excess area of diaphragm 19 will permit the inner portion of the diaphragm to be forced downwardly by the air pressure above the diaphragm to follow the contour of the upper surface of fluid 35 when the latter is forced outwardly at high driving shaft speeds.

In operation, the fluid coupling when in a position of rest will have the configuration shown in Figure 1. When in this position, diaphragm 19 will be substantially flat, with lip 39 thereof turned upwardly along shaft 22. When driving shaft 14 is rotated at a relatively slow speed, say below 100 r.p.m., fluid 35 will be dragged along due to its frictional contact with shell portion 15 and diaphragm 19, but the rotational speed of the fluid will be so low that insufficient torque will be exerted on disk 21 and the adjacent portion of driven shaft 22 to rotate shaft 22 or switch actuating cam 28. When the rotational speed of driving shaft 14 exceeds 100 r.p.m., the movement of fluid 35 will be increased to such an extent that sufficient torque will be exerted on shaft 22 to actuate switch 31 from the position shown in Figure 2 to a position in which contact 33 engages stationary contact 34. As higher speeds are attained by driving shaft 14, the temperature of fluid 35 will increase, thus decreasing its viscosity. The result will be that the torque transmitted to driven shaft 22 will not be directly proportional to driving shaft speed, but will tend to approach a maximum, thus limiting the maximum torque that can be exerted on switch 32 and preventing damage to the switch even at extremely high vehicle speeds.

During operation of the device at higher speeds, fluid 35 will tend to move outwardly due to centrifugal forces exerted upon it. When this occurs, diaphragm 19 may shift from the configuration shown in solid lines in Figure 1 to a configuration similar to that shown in dot-dash lines in that figure. As will be seen, the altered shape of diaphragm 19 could include a bulged portion 41 adjacent its outer periphery, and a downward shift of the inner lip 39 adjacent driven shaft 22. Due to the slight excess of diaphragm area adjacent shaft 22, the inner edge of lip 39 will remain in contact with shaft 22. The downward pressure exerted by spring 36 on diaphragm 19 through plate 38 will aid in causing the diaphragm to follow the configuration of the upper surface of fluid 35 as the driving shaft speed is increased. The result will be that air will be prevented from flowing in between fluid 35 and driven shaft 22, the surface of shaft 22 both above and below disk 21 being continuously engageable by fluid 35.

Upon sudden deceleration of driving shaft 14 and shell 16, fluid 35 will tend to rush back toward the central axis of the coupling. This will cause diaphragm 19 to assume a shape similar to its former configuration as shown in solid lines in Figure 1. Since diaphragm 19 will be in engagement with the upper surface of fluid 35 throughout movement of the latter away from and back to its original position, there will be no opportunity for air to be entrained in the fluid.

It will thus be seen that a novel and improved fluid coupling has been provided which is highly torque-sensitive at relatively low driving shaft speeds and which may be operated safely at extremely high speeds of the driving shaft without damage to torque-responsive parts operated thereby. The device includes means for preventing the inadvertent entrainment of air bubbles in the fluid which might hamper operation and decrease accuracy of the coupling, thereby making it suitable for use in conjunction with switches and other speed-responsive apparatus in which high reliability under adverse conditions is required.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a fluid coupling, a rotatable driving shaft, a rotatable driven shaft, a shell secured to the end of one of said shafts, a diaphragm secured to said shell and forming a chamber therewith, an apertured portion at the central portion of said diaphragm, said other shaft extending through said apertured portion, a disk fixed to the inner end of said other shaft within said chamber, and a fluid filling said chamber, said diaphragm having an excess area engageable with said other shaft, whereby said diaphragm will be permitted to maintain contact with the adjacent surface of said fluid when the fluid moves outwardly due to centrifugal forces, thereby preventing entrainment of air bubbles in said fluid.

2. In a fluid coupling, a rotatable driving shaft, a rotatable driven shaft, a shell secured to the end of one of said shafts, a diaphragm secured within said shell and forming a chamber between said diaphragm and the end of said shell adjacent said end of the one shaft, apertured portions at the other end of said shell and the central portion of said diaphragm, said other shaft extending through said apertured portions, a disk fixed to the inner end of said other shaft within said chamber, a fluid filling said chamber, and a helical compression spring disposed between said other end of the shell and said diaphragm, said diaphragm having an excess area engageable with said other shaft, whereby said diaphragm will be permitted to maintain contact with the adjacent surface of said fluid when the fluid moves radially outwardly due to centrifugal forces, thereby preventing entrainment of air bubbles in said fluid.

3. In a fluid coupling, a rotatable driving shaft, a rotatable driven shaft, a shell secured to the end of one of said shafts, a diaphragm secured within said shell and forming a chamber between said diaphragm and the end of said shell adjacent said end of the one shaft, apertured portions at the other end of said shell and the central portion of said diaphragm, said other shaft extending through said apertured portions, a disk fixed to the inner end of said other shaft within said chamber, a fluid filling said chamber, and a helical compression spring disposed between said other end of the shell and said diaphragm, said diaphragm having a portion in engagement with said shaft whereby said diaphragm will maintain contact with the adjacent surface of said fluid when said surface is deformed due to centrifugal forces acting on said fluid, thereby preventing entrainment of air bubbles in said fluid.

4. In a fluid coupling, a rotatable driving shaft, a rotatable driven shaft, a shell secured to the end of one of said shafts, a diaphragm secured to said shell and forming a chamber therewith, an apertured portion at the central portion of said diaphragm, said other shaft extending through said apertured portion, a disk fixed to the inner end of said other shaft within said chamber, and a fluid filling said chamber, said fluid having a relatively high viscosity at normal temperatures and a lesser viscosity at higher temperatures, said diaphragm having an excess area engageable with said other shaft, whereby said diaphragm will be permitted to maintain contact with the adjacent surface of said fluid when the fluid moves outwardly due to centrifugal forces, thereby preventing entrainment of air bubbles in said fluid.

5. In a fluid coupling, a rotatable driving shaft, a rotatable driven shaft, a shell fixed to one of said shafts, a radially extending diaphragm secured within said shell and forming a chamber in conjunction with one end of the shell, a disc disposed within the chamber formed between said diaphragm and said one end of said shell, said disc being secured to the other shaft, and a fluid completely filling said shell chamber, said diaphragm having a central portion of such configuration that outward movement of said diaphragm due to centrifugal forces thereon exerted by said fluid will cause the central portion of said diaphragm to move toward said chamber, thereby preventing the entrainment of air bubbles in said fluid.

References Cited in the file of this patent

UNITED STATES PATENTS

| | | |
|---|---|---|
| 1,203,265 | Radcliffe | Oct. 31, 1916 |
| 1,238,447 | Severy | Aug. 28, 1917 |
| 1,868,245 | Obermoser | July 19, 1932 |
| 2,314,404 | Katcher | Mar. 23, 1943 |
| 2,422,155 | Wemp | June 10, 1947 |
| 2,448,646 | Wisniewski | Sept. 7, 1948 |
| 2,555,772 | Wickwire | June 5, 1951 |
| 2,570,854 | Pierce | Oct. 9, 1951 |
| 2,601,076 | Winther et al. | June 17, 1952 |
| 2,629,472 | Sterner | Feb. 24, 1953 |
| 2,708,018 | Dudley | May 10, 1955 |

FOREIGN PATENTS

| | | |
|---|---|---|
| 388,880 | Great Britain | Mar. 9, 1933 |
| 711,430 | Great Britain | June 30, 1954 |